United States Patent
Strasser et al.

(10) Patent No.: US 7,133,612 B1
(45) Date of Patent: Nov. 7, 2006

(54) BIDIRECTIONAL WDM TRANSMISSION SYSTEM HAVING TRANSMISSION FORMAT FOR REDUCING ADVERSE EFFECTS OF FILTER CONCATONATION

(75) Inventors: Thomas Andrew Strasser, Warren, NJ (US); Per Bang Hansen, Rumson, NJ (US)

(73) Assignee: Meriton Networks US Inc., Wilmington, DE (US)

( * ) Notice: Subject to any disclaimer, the term of this patent is extended or adjusted under 35 U.S.C. 154(b) by 557 days.

(21) Appl. No.: 10/214,834

(22) Filed: Aug. 8, 2002

(51) Int. Cl.
*H04K 3/00* (2006.01)
(52) U.S. Cl. .......................................... 398/39; 398/48
(58) Field of Classification Search ................. 398/39, 398/48
See application file for complete search history.

(56) References Cited

U.S. PATENT DOCUMENTS

| | | | |
|---|---|---|---|
| 5,633,741 A | 5/1997 | Giles | 359/124 |
| 6,243,177 B1 | 6/2001 | Duerksen | 359/127 |
| 2002/0105692 A1* | 8/2002 | Lauder et al. | 359/124 |
| 2003/0063349 A1* | 4/2003 | Peeters et al. | 359/161 |

OTHER PUBLICATIONS

U.S. Appl. No. 09/571,833, filed May 16, 2000, Wagener et al.
U.S. Appl. No. 09/691,812, filed Oct. 19, 2000, Wagener et al.

* cited by examiner

*Primary Examiner*—David C. Payne
(74) *Attorney, Agent, or Firm*—Mayer & Williams PC; Stuart H. Mayer, Esq.; Karin L. Williams, Esq.

(57) ABSTRACT

A WDM optical transmission system is provided that operates at a plurality of channel wavelengths. The system includes at least three nodes at which any one or more of the channel wavelengths can be added or dropped. At least three optical transmission links interconnect the nodes. Each link includes a single waveguide over which travel oppositely-directed WDM signals having channel wavelengths that are interleaved with one another in a pairwise manner. A majority of the optical transmission links each have an optical span loss that corresponds to a level of coherent crosstalk between a reflected channel at a given wavelength co-propagating with a channel at the given wavelength prior to isolating one of the adjacent channels in a node that is less than a level of coherent crosstalk that would otherwise arise if a unidirectional transmission format were employed over a single waveguide in the same system.

14 Claims, 4 Drawing Sheets

BIDIRECTIONAL WDM TRANSMISSION SYSTEM HAVING TRANSMISSION FORMAT FOR REDUCING ADVERSE EFFECTS OF FILTER CONCATONATION

FIELD OF THE INVENTION

The present invention is generally related to WDM optical transmission systems, and more particularly to bidirectional optical communication systems that transport WDM signals over the bi-directional waveguiding medium.

BACKGROUND OF THE INVENTION

Optical communication systems are a substantial and fast growing constituent of communication networks. Wavelength Division Multiplexing (WDM) (and its more recent incarnation, Dense WDM or DWDM) is one technique used to increase the capacity of optical transmission systems. A wavelength division multiplexed optical transmission system employs plural optical channels, each channel being assigned a particular channel wavelength. In a WDM system, optical channels are generated, multiplexed to form an optical signal comprised of the individual optical channels, transmitted over a waveguide, and demultiplexed such that each channel wavelength is individually routed to a designated receiver.

WDM systems have been deployed in long distance networks in a point-to-point configuration consisting of end terminals spaced from each other by one or more segments of optical fiber. Because the communication traffic in such systems commonly travels many hundreds of kilometers, the need for add-drop multiplexing of individual channels is infrequent, occurring at widely spaced add-drop nodes. In metropolitan areas, however, WDM systems having a ring or loop configuration are currently being developed. Such systems typically include a plurality of nodes located along the ring. At least one optical add/drop element, associated with each node, is typically connected to the ring with optical connectors. The optical add/drop element permits both addition and extraction of channels to and from the ring. A particular node that allows the addition and extraction of all the channels is commonly referred to as a hub or central office node, and typically has a plurality of associated add/drop elements for transmitting and receiving a corresponding plurality of channels to/from other nodes along the ring. Metropolitan communications systems clearly require considerably more extensive add-drop multiplexing in order to successfully implement wavelength division multiplexing in their short-range systems.

Optical filters are essential components of add-drop multiplexers to select certain wavelengths and reject others. These filters need to have sharp passbands, i.e., passbands in which the transmission changes very rapidly with wavelength, to prevent crosstalk between adjacent channels. Moreover, when two or more filters are cascaded, the overall passband is smaller than the passband of the individual filters. That is, the overall bandwidth narrows due to the cascading of the filters. As a result it becomes even more important to employ sharp filters when WDM signals are required to traverse a large number of add-drop multiplexers such as in a metropolitan communication system. This requirement becomes more stringent as the spacing between adjacent wavelengths continues to decrease. In current WDM systems, for example, adjacent wavelengths may only be separated by 1 nm or less. It is generally recognized that when a wavelength is dropped at a single location in current WDM systems it should be isolated to about −30 dB with very low extinction at adjacent wavelengths. This requirement arises from the need to limit multi-path interference (MPI), also referred to as in-band crosstalk, which causes severe signal degradation when a residual signal at the same wavelength coherently interferes with a DWDM channel. It should be noted that this crosstalk arises from optical channel processing components within the node rather than the traditional source of MPI, which arises within the transmission span from two discrete reflections.

Such a coherent interference scales as the square of the intensity of the crosstalk signal for a single interference such as imperfect isolation of a single dropped signal described above. While this is a very demanding requirement, a much worse case arises in a transparent optical network when one or more spurious paths of a signal arise from the optical signal processing within a node. When this occurs, a single optical signal routed through many nodes can experience small coherent crosstalk contributions in each node. If the pathlength differences experienced by these crosstalk sources are similar, the worst case crosstalk contributions also sum coherently as the square of individual intensities when polarization and phase align to allow constructive interference of the interference signals.

Assuming the existence of n independent interference paths of equal intensity within the path of a signal through the network, and that at some period of time all n sources of the in-band crosstalk will constructively interfere, it can be shown that the maximum crosstalk value tolerable for those n crosstalk sources is less than the single node value of −30 dB by 20*log(n). Thus, for a signal that traverses N nodes and experiences n sources of MPI in each node, the maximum coherent crosstalk allowable at each node is −30 dB−20*log(N*n), which corresponds to <−54 dB for a signal with one MPI path per node traversing 16 nodes.

The worst-case situation described above will arise in practice within a conventional unidirectional WDM optical system if wavelength channels are demultiplexed for individual channel optical Add/Drop, and then multiplexed back together. This arrangement allows only one low loss path for a given wavelength through the device, however a small amount of each channel will transmit as crosstalk through the low loss paths of other channels. The highest crosstalk through such a path is typically an adjacent channel, where a worst case crosstalk for a demultiplexer and multiplexer are −25 dB and −10 dB respectively. Thus a net crosstalk of −35 dB can transmit through two paths (adjacent channels on either side), which is larger than the total maximum coherent crosstalk specified in the equation above for one node with two crosstalk paths (−36 dB). Lower levels of crosstalk in this application can be realized at the expense of added filter narrowing, cost and insertion loss by replacing the multiplexer device with a demultiplexer. This would yield a worst case crosstalk through the node of −50 dB, which for two paths at each node (n=2), would only be sufficient in the above equation for N=5 nodes.

The above requirements highlight the need for filters with high adjacent channel crosstalk in metropolitan area systems because of their extensive use of add/drop multiplexers to add and drop wavelengths at virtually every node, which means that each node is a potential source of coherent interference, or additional MPI. It can be demonstrated, for example, that for a metropolitan area system having 16 nodes with a maximum degree of flexibility in which every wavelength can be accessed at every node, requires the ability to filter or isolate individual wavelengths to about −55 dB or more in each node Unfortunately, the vast majority of filters employed in communications systems exhibit a larger wavelength-dependent phase disturbance or group delay (chromatic dispersion) as the filter passband becomes sharper to reduce adjacent channel crosstalk. Dispersion limits the maximum distance a signal can travel before undergoing an unacceptable degree of degradation. While in principle it is possible to have a filter with a perfectly square passband, it comes at the expense of an unacceptably large amount of dispersion. Thus there is a tradeoff that needs to be optimized between the sharpness of a filter's passband and its dispersion. While current filter technologies can largely achieve the −30 dB of isolation required for a single MPI source, it becomes much more problematic to use current channel spacings and achieve 55 dB of isolation while maintaining dispersion at acceptable levels. Moreover, in future communication systems where each channel is expected to transmit at higher bit rates at narrower channel spacing, the limitation imposed by dispersion becomes even more severe.

Accordingly, there is a need for an arrangement that provides sufficient filtering for use in metropolitan area WDM communication systems without increasing the dispersion by an undue amount.

SUMMARY OF THE INVENTION

In accordance with the present invention, a WDM optical transmission system is provided that operates at a plurality of channel wavelengths. The system includes at least three nodes at which any one or more of the channel wavelengths can be added or dropped. At least three optical transmission links interconnect the nodes. Each link includes a single waveguide over which travel oppositely-directed WDM signals having channel wavelengths that are interleaved with one another in a pairwise manner. A majority of the optical transmission links each have an optical span loss that corresponds to a level of coherent crosstalk between a reflected channel at a given wavelength co-propagating with a channel at the given wavelength prior to isolating one of the adjacent channels in a node that is less than a level of coherent crosstalk that would otherwise arise if a unidirectional transmission format were employed over a single waveguide in the same system.

In accordance with one aspect of the invention, the optical transmission links support a bi-directional transmission format.

In accordance with another aspect of the invention, the optical transmission links include at least two waveguides supporting a hybrid unidirectional transmission format.

In accordance with yet another aspect of the invention, the coherent crosstalk arising among the pairwise interleaved channels is defined by discrete reflections arising in the optical transmission links.

In accordance with another aspect of the invention, at least one of the nodes includes a first arrangement for processing a first WDM signal traveling in a first direction along the optical transmission path and a second arrangement for processing a second WDM signal traveling in a second direction along the optical transmission path. A first optical circulator directs the first WDM signal to the first processing arrangement and directs the second WDM signal back to the optical transmission path. A second optical circulator directs the second WDM signal to the second processing arrangement and directs the first WDM signal back to the optical transmission path.

In accordance with another aspect of the invention, a method is provided for accessing individual channels in a WDM signal propagating along a WDM transmission link having a waveguide supporting bi-directional WDM signals. The WDM transmission link is a part of a WDM optical transmission system having at least three optical transmission links interconnecting at least three network nodes. The method begins by selecting, on a basis of direction, from between first and second WDM signals, the first WDM signal including a plurality of first optical channels propagating in a first direction and the second WDM signal including a plurality of second optical channels propagating in a second direction. The first and second optical channels are spectrally interleaved with one another. The method continues by spectrally filtering at least one channel from the selected one of the first and second WDM signals so that the spectrally filtered may be accessed for subsequent processing. A majority of the optical transmission links in the transmission system each have an optical span loss that corresponds to a level of coherent crosstalk between a reflected channel at a given wavelength co-propagating with a channel at the given wavelength prior to isolating one of the adjacent channels in a network node that is less than a level of coherent crosstalk that would otherwise arise if a unidirectional transmission format were employed over a single waveguide in the same system.

In accordance with one aspect of the invention, the step of selecting on the basis of direction is performed by a circulator.

In accordance with another aspect of the invention, the step of selecting on the basis of direction is performed by a wavelength selective routing device. The wavelength selective routing device, which may have a periodic transmission response as a function of frequency, may be a Fabry-Perot interferometric arrangement, a Mach-Zehnder interferometric arrangement, or a an interleaver.

DETAILED DESCRIPTION

The present inventors have recognized that the filtering that must occur in network nodes when individual channels are accessed can be accomplished in part with a filtering element that operates on the basis of directional selectivity instead of spectral selectivity. In particular, the inventors have recognized that a WDM system in which the paths between nodes use bi-directional transmission within a single optical fiber can reduce the need for conventional filtering by interleaving adjacent channels so that they travel in opposite directions and then deinterleaving them prior to filtering with a conventional spectrally selective filter. In this way when a channel needs to be accessed by the spectrally selective filter the channel spacing has been increased by two, reducing the sharpness of the filter's passband that is needed to accomplish the requisite degree of isolation.

Figure 1:
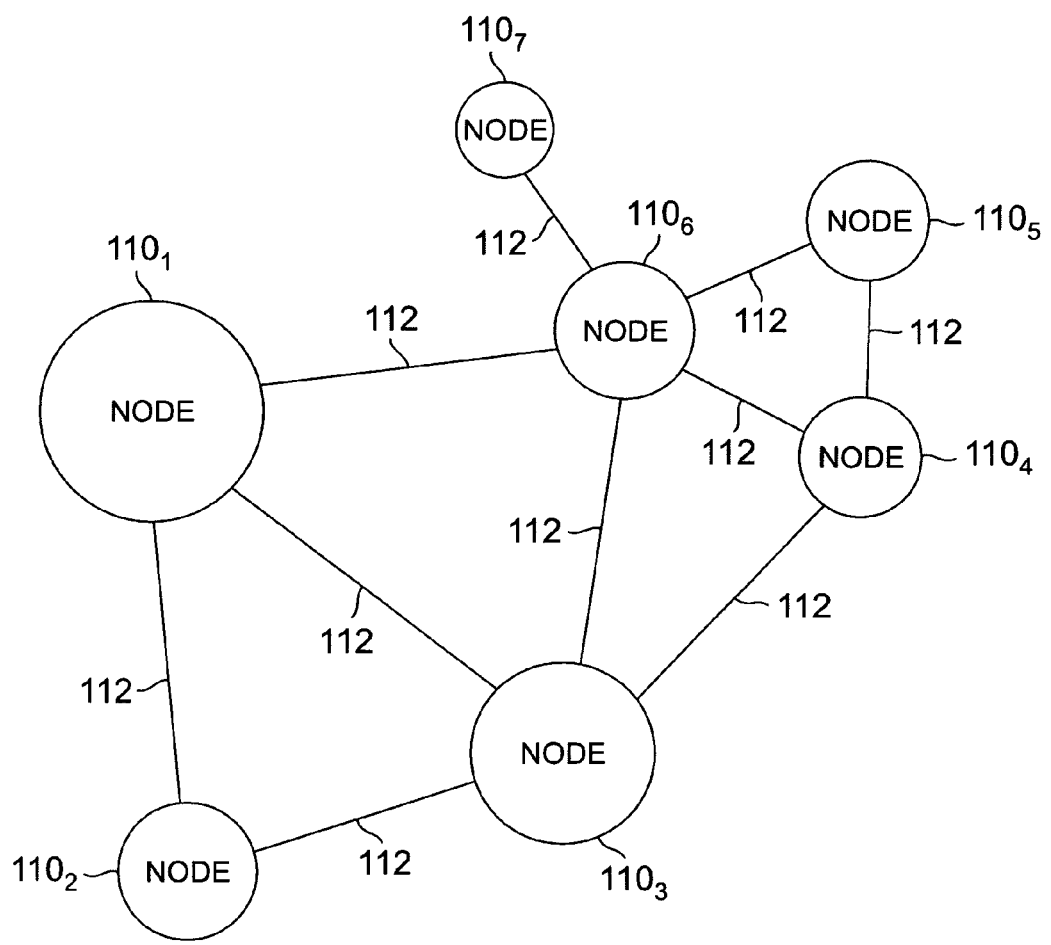
FIG. 1 schematically depicts a bi-directional wavelength division multiplexed optical system constructed in accordance with the present invention.

FIG. 1 schematically depicts a bi-directional wavelength division multiplexed optical system constructed in accordance with the present invention. The individual optical transmission links 112 interconnecting the nodes $110_1$–$110_7$ are bi-directional optical transmission waveguides that each supports two counter-propagating WDM optical communication signals. Accordingly, each end of link 112 must communicate with both an optical transmitter and an optical receiver. Unlike long-haul transmission systems, regional and metropolitan area optical networks typically do not include a single transmitter and receiver location. Instead, as optical channels are continually routed through the use of optical add-drop multiplexers, transmitters and/or receivers are located in various nodes $110_1$–$110_7$ along an optical transmission path, such as an optical ring, subtended optical ring, or an optical mesh arrangement. This is a considerable difference from conventional unidirectional long-haul systems in which an optical fiber merely has to be connected to one or more transmitters at one end and one or more receivers at the other end. Instead, in metropolitan area networks such transmitters and receivers are more likely associated with add-drop multiplexers positioned at the various nodes so that there is a continual adding and dropping of individual channels such that each channel may have originated at different nodes throughout the system.

The add-drop multiplexers located in nodes $110_1$–$110_7$ are preferably reconfigurable optical switches that can selectively direct any wavelength component from any input port to any output port, independent of the routing of the other wavelengths. This provides a flexible network in which any wavelength component can be routed between any pair of nodes independently of the routing of any other wavelength component. Various examples of all-optical reconfigurable optical switches that provide this degree of flexibility are disclosed in U.S. patent application Ser. No. 09/571,833, which is hereby incorporated by reference in its entirety, and in particular FIGS. 2–4 of that reference. The reconfigurable switching elements disclosed therein can selectively direct any wavelength component from any input port to any output port, independent of the routing of the other wavelengths, without the need for any electrical-to-optical conversion. Another all-optical reconfigurable optical switch that provides additional functionality is disclosed in U.S. patent application Ser. No. 09/691,812, which is hereby incorporated by reference in its entirety. This reference discloses an optical switching element in which each and every wavelength component can be directed from any given port to any other port without constraint. More specifically, unlike most optical switches, this switch is not limited to providing connections between a subset of input ports and a subset of output ports, or vice versa. Rather, this switch can also provide a connection between two ports within the same subset (either input or output). Of course, those of ordinary skill in the art will recognize that the present invention is equally applicable to networks that employ other optical switches, including switches that have less flexibility than the aforementioned optical switches.

Figure 2:
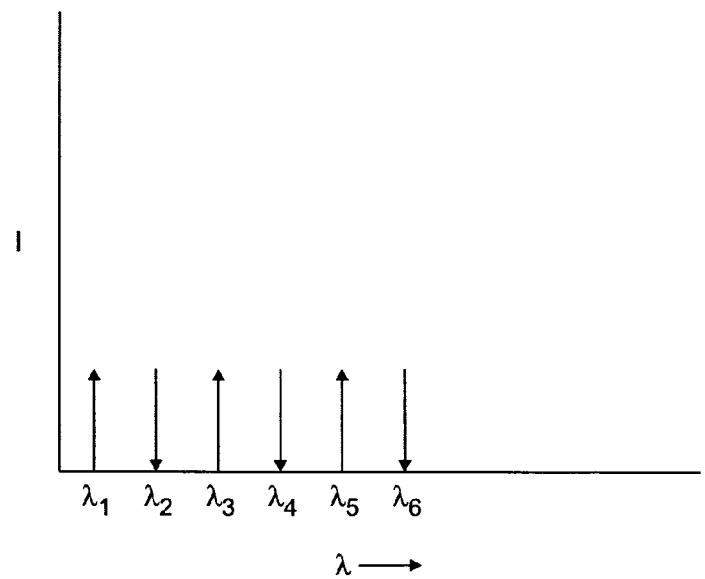
FIG. 2 shows a transmission format in which channel wavelengths traveling in one direction are interleaved with channel wavelengths traveling in the opposite direction.

As previously mentioned, the individual transmission links 112 are bi-directional waveguides or fibers that support two counter-propagating WDM signals each of which comprise optical channels at different wavelengths. In accordance with traditional industry nomenclature, one of the WDM signals propagating in a first direction is designated the west-east WDM signal while the WDM signal propagating in the opposite direction is designated the east-west WDM signal. For clarity of presentation, the individual optical channels in the west-east WDM optical signal are denoted by the symbols $\lambda_1, \lambda_3, \lambda_5$, etc., while the individual optical channels in the east-west WDM optical signal are denoted by the symbols $\lambda_2, \lambda_4, \lambda_6$, etc. As shown in FIG. 2, the channel wavelengths $\lambda_1, \lambda_3, \lambda_5$ of the west-east WDM signal are interleaved with channel wavelengths $\lambda_2, \lambda_4, \lambda_6$ of the east-west WDM signal so that adjacent wavelengths are traveling in opposite directions on links 112. As shown below, when the WDM signals enter a node they are deinterleaved to separate the two WDM signals so that when they undergo further processing the spacing between adjacent, deinterleaved channels is increased by two.

Figure 3:
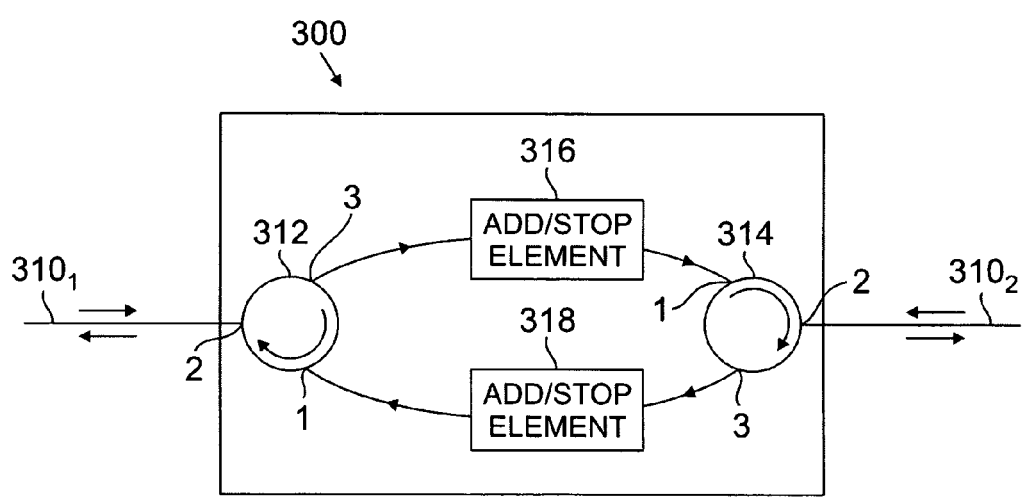
FIG. 3 shows one embodiment of a network node that may be employed in the transmission system of FIG. 1.

FIG. 3 shows a node 300 interposed between bi-directional waveguides $310_1$ and $310_2$, which may be part of a metropolitan area transmission system of the type depicted in FIG. 1. Node 300 includes three-port circulators 312 and 314, which respectively receive the counter-propagating WDM signals as they enter the node 300 along waveguides $310_1$ and $310_2$. In each of these three-port circulators, optical signals entering the first optical port of the circulator are Faraday rotated to exit the second optical port. Similarly, optical signals entering the second optical port exit through the third optical port. While the embodiment of the invention depicted in FIG. 3 employs conventional circulators, the invention more generally encompasses any device that is capable of transferring optical signals among plural outputs based on their directionality.

Upon entering node 300 the west-east WDM signal is directed to port 2 of circulator 312 and exits on port 3, where it is directed to conventional processing elements in the node, represented herein by add/drop element 316. Likewise, the east-west WDM signal is directed to port 2 of circulator 314 and exits through port 3, where it is directed to conventional processing elements in the node, represented herein by add/drop element 318. In this way any filtering performed in the add/drop elements 316 and 318 is performed on channels that are spectrally separated by twice the distance between adjacent channels when the WDM signals are propagating along the links of the system. Those of ordinary skill in the art will recognize that the WDM signals may undergo additional processing not shown here such as amplification in optical amplifiers, for example, which need not be discussed in further detail. It is simply of primary importance to note that after the oppositely directed WDM signals are separated by the circulators any further processing, and in particular any filtering that needs to be performed such as when a channel is dropped or otherwise accessed, is performed on the WDM signals individually. Because the wavelengths of the oppositely directed WDM signals have been deinterleaved, this subsequent processing is accordingly performed on wavelengths with twice the spacing between wavelengths relative to the spacing between wavelengths when traveling on waveguides 310.

While the filtering that must be performed on the WDM signals in node 300 still needs to achieve a level of isolation on the order of about −55 dB, this requirement is now more easily met because the increased channel spacing places less stringent demands on the filter's passband characteristics, enabling conventional filtering technology to be used. The present invention thereby allows the channels to be closely spaced during transmission over the communication system, thus increasing the amount of data that can be transmitted, while filtering is performed on signals with a greater channel spacing that is more easily processed.

One additional source of MPI is present in a bi-directional transmission system in which a single fiber supports counter-propagating WDM signals. In this configuration interference caused by signals reflected at discrete locations on either side of a node can create an interference path through the node. While discrete reflections can arise in a number of circumstances, a common source of such reflections is from connectors located along the transmission path. For instance, referring again to FIG. 3, if after traversing node 300 a portion of the west-east signal is reflected from a connector located along waveguide $310_2$ back toward node 300, the reflected signal will re-enter node 300 via circulator 314 since the circulator only provides directional selectivity and not spectral selectivity. That is, even though the reflected signal is located at a wavelength not normally propagating in the east-west direction, it will still enter node 300 because the circulator 314 will convey any signal propagating in the east-west direction regardless of wavelength. Once in the node, the reflected signal will undergo any processing in add/drop element 318 that the east-west signals undergo. Since the reflected signal is out of band interference with respect to the east-west signal, this processing is not overly problematic. However, after processing the reflected signal will continue along its path and exit the node via circulator 312. If the reflected signal is re-reflected from another connector along waveguide $310_1$, this twice-reflected signal its now propagating in the same direction as the original signal, thus giving rise to coherent interference with a very long path delay.

The power of the twice-reflected signal will depend first on the reflectivity of the connectors. A common Telcordia standard that is sometimes employed for connectors specifies that a connector's maximum reflectivity should be no greater than −30 dB. Accordingly, if both connectors reflecting the twice-reflected signal just meet this standard, the twice-reflected signal will be attenuated by −60 dB from the original signal. However, the reflected signal was presumably amplified while traversing node 300 and thus was no longer attenuated by −30 dB upon exiting the node 300. Moreover, upon exiting the node after being amplified, the reflected signal has not yet suffered any span losses in the link and thus is at its maximum power. If the reflected signal is then again reflected in the vicinity of the node, it will coherently interfere with an incoming signal from a neighboring node that is at its lowest power, since the incoming signal has suffered almost a complete span loss. Assuming both signals were launched from the node with the same power, the difference in their power at the point when they interfere is about equal to a span loss. Accordingly, the net isolation between the twice-reflected signal and the incoming signal from the neighboring node located at the same wavelength as the twice-reflected signal is equal to 2Rc−2L, where Rc is the reflectivity of the connectors and L is the span loss. Assuming a value of Rc equal to about −30 dB and a span loss of about −25 dB, the twice-reflected signal is only attenuated by about −10 dB. Since as previously mentioned this level of isolation is generally insufficient, additional filtering is often required to accomplish bi-directional transmission on a single fiber.

Figure 4:
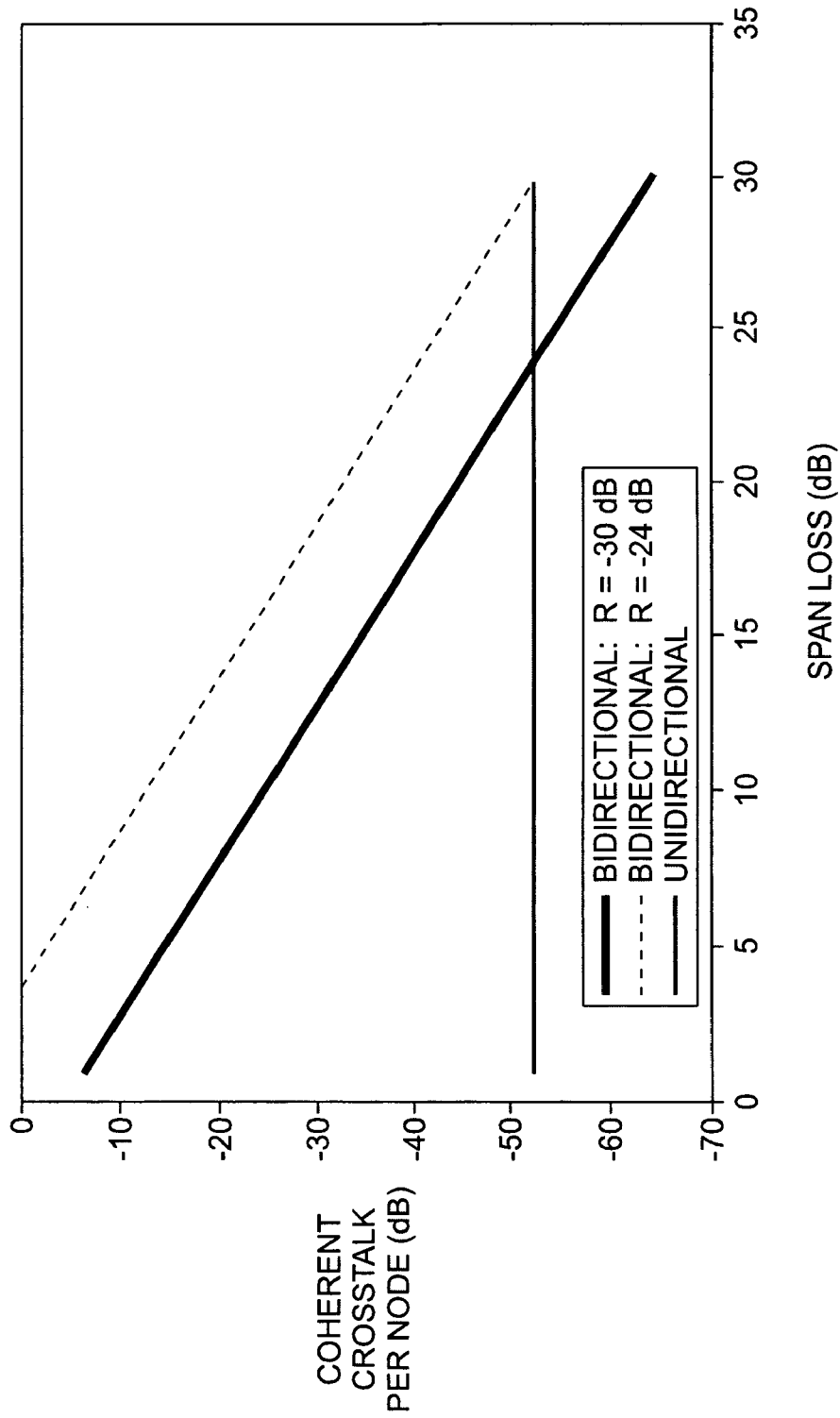
FIG. 4 shows the coherent crosstalk as a function of span loss that arises when using unidirectional transmission and bi-directional transmission along a single transmission waveguide in which the channel of the oppositely-directed WDM signals are interleaved.

It is noted that each set of interleaved WDM signals traveling in one direction still incurs adjacent channel MPI within the OADM as described earlier in conventional systems. However because the channel spacing is twice a large, it is anticipated that conventional filtering technology can reduce the OADM crosstalk to such a low level that the intranode MPI from span reflections described above will represent the system limitation. Assuming this, FIG. 4 summarizes the impact of span loss on the required coherent crosstalk filtering that arises when using unidirectional transmission and bi-directional transmission along a single transmission waveguide in which the channel of the oppositely-directed WDM signals are interleaved. That is, FIG. 4 shows how much isolation must be provided in each node between adjacent channels. As previously mentioned, for unidirectional transmission in a system having a single MPI source in each of 16 nodes in which every wavelength is accessible at every node, each wavelength must be able to be filtered or isolated to about −54 dB, and, as shown, this level of isolation is independent of span loss. On the other hand, for an equivalently flexible bi-directional system having an equal channel spacing in the bi-directional fiber, but half the channel spacing in the OADM, the amount of isolation that must be provided increases with span length and is dependent on the maximum reflectivity that may arise from components in optical transmission path. FIG. 4 shows the amount of isolation required when the maximum reflectivity meets the Telecordia standard of −30 dB and for a less stringent requirement of −24 dB.

From FIG. 4 is can be seen that there is a regime in which bi-directional transmission on a single fiber requires less filtering than unidirectional transmission. In this particular example, that regime extends from upwards of a span loss of about 24 dB to about 30 dB. That is, below a span loss of about 24 dB to 30 dB there is a filtering advantage from using bi-directional transmission on a single fiber with an interleaved transmission format. Such a span loss corresponds generally to a maximum transmission distance of about 70 km between nodes, which is well within the range envisioned for most metropolitan transmission systems. On the other hand, long-haul transmission systems are typically longer and have span losses that exceed this range. Of course, this regime in which the bi-directional transmission system offers an advantage depends on the total number of nodes traversed and the maximum reflectivity that may arise from various components in the optical transmission path. Moreover, the inventive bi-directional transmission system is particularly advantageous when a majority of the spans between nodes fall in the aforementioned regime in which less filtering is required. The inventive system is even more advantageous if at least 75%, and preferably at least 90% of the spans between nodes fall in this regime.

Figure 5A:
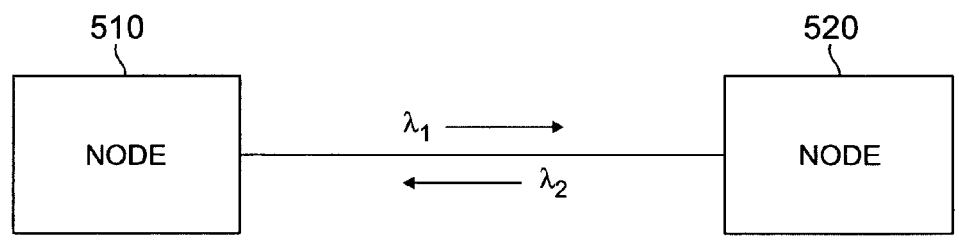
FIG. 5(a) shows a conventional bi-directional transmission format in which a service employs oppositely directed wavelengths traveling on a single fiber between two nodes.
Figure 5B:
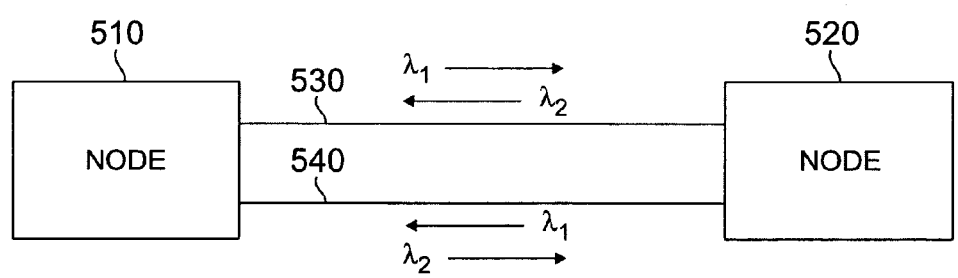
FIG. 5(b) shows a hybrid unidirectional transmission format in which a given service employs the same wavelength for the oppositely directed signals, but which travel on different fibers.

The aforementioned description of the present invention as a bi-directional transmission system is meant only to convey that optical signals are traveling in both directions on the optical fiber interconnecting nodes. Although bi-directional transmission also traditionally implies that the transmit and receive signals of a given service are transmitted on different wavelengths on a single fiber, the advantages of the present invention are not limited to this specific arrangement. The benefits of the present invention are also realized in a system where two fibers interconnect each node and transmit/receive for a given service are sent at the same wavelength, if the adjacent wavelength on each fiber travels in the opposite direction as the transmit/receive pair for a different service. Such a transmission arrangement is a hybrid combination between unidirectional and bidirectional and accordingly is referred to as a hybrid unidirectional transmission format. FIG. 5(a) shows a conventional bi-directional transmission format in which a service employs oppositely directed wavelengths $\lambda_1$ and $\lambda_2$ traveling on a single fiber between nodes 510 and 520. FIG. 5(*b*), in contrast, shows a hybrid unidirectional transmission format in which a given service employs the same wavelength $\lambda_1$ for the oppositely directed signals, but which travel on different fibers 530 and 540. Also shown in FIG. 5(*b*) is a wavelength $\lambda_2$, which is employed by another service. Wavelength $\lambda_2$ travels in the opposite direction from wavelength $\lambda_1$ on both fibers 530 and 540. The interleaving of wavelengths in a hybrid unidirectional system is achieved by a directional coupling arrangement within each node of the type shown in FIG. 3. The hybrid unidirectional transmission format may be used to leverage the wavelength assignment and operational simplicity of a unidirectional system, while still achieving the filtering advantages of the present invention.

What is claimed is:

1. A WDM optical transmission system operating at a plurality of channel wavelengths, comprising:
    at least three nodes at which any one or more of the channel wavelengths can be added or dropped;
    at least three optical transmission links interconnecting the nodes that each include a single waveguide over which travel oppositely-directed WDM signals having channel wavelengths that are interleaved with one another in a pairwise manner; and
    wherein a majority of the optical transmission links each have an optical span loss that corresponds to a level of coherent crosstalk between a reflected channel at a given wavelength co-propagating with a channel at the given wavelength prior to isolating one of the adjacent channels in a node that is less than a level of coherent crosstalk that would otherwise arise if a unidirectional transmission format were employed over a single waveguide in the same system.

2. The system of claim 1 wherein the optical transmission links support a bi-directional transmission format.

3. The system of claim 1 wherein the optical transmission links include at least two waveguides supporting a hybrid unidirectional transmission format.

4. The system of claim 1 wherein the coherent crosstalk arising among the pairwise interleaved channels is defined by discrete reflections arising in the optical transmission links.

5. The system of claim 1 wherein said majority comprises at least 75% of the optical transmission links.

6. The system of claim 1 wherein said majority comprises at least 90% of the optical transmission links.

7. The system of claim 1 wherein at least one of the nodes includes:
    first means for processing a first WDM signal traveling in a first direction along the optical transmission path;
    second means for processing a second WDM signal traveling in a second direction along the optical transmission path;
    a first optical circulator directing the first WDM signal to the first processing means and directing the second WDM signal back to the optical transmission path; and
    a second optical circulator directing the second WDM signal to the second processing means and directing the first WDM signal back to the optical transmission path.

8. A method for accessing individual channels in a WDM signal propagating along a WDM transmission link having a waveguide supporting bi-directional WDM signals, wherein the WDM transmission link is a part of a WDM optical transmission system having at least three optical transmission links interconnecting at least three network nodes, said method comprising the steps of:
    selecting, on a basis of direction, from between first and second WDM signals, the first WDM signal including a plurality of first optical channels propagating in a first direction and the second WDM signal including a plurality of second optical channels propagating in a second direction, said first and second optical channels being spectrally interleaved with one another; and
    spectrally filtering at least one channel from the selected one of the first and second WDM signals so that said at least one channel may be accessed for subsequent processing; and
    wherein a majority of the optical transmission links in the transmission system each have an optical span loss that corresponds to a level of coherent crosstalk between a reflected channel at a given wavelength co-propagating with a channel at the given wavelength prior to isolating one of the adjacent channels in a network node that is less than a level of coherent crosstalk that would otherwise arise if a unidirectional transmission format were employed over a single waveguide in the same system.

9. The method or claim 8-wherein the step of selecting on the basis of direction is performed by a circulator.

10. The method of claim 8 wherein the step of selecting on the basis of direction is performed by a wavelength selective routing device.

11. The method of claim 10 wherein the wavelength selective routing device has a periodic transmission response as a function of frequency.

12. The method of claim 11 wherein the periodic wavelength selective routing device includes a Fabry-Perot interferometric arrangement.

13. The method of claim 11 wherein the periodic wavelength selective routing device is a Mach-Zehnder interferometric arrangement.

14. The method of claim 11 wherein the periodic wavelength selective device is an interleaver.

* * * * *

UNITED STATES PATENT AND TRADEMARK OFFICE
CERTIFICATE OF CORRECTION

| | | |
|---|---|---|
| PATENT NO. | : 7,133,612 B1 | Page 1 of 2 |
| APPLICATION NO. | : 10/214834 | |
| DATED | : November 7, 2006 | |
| INVENTOR(S) | : Thomas Andrew Strasser et al. | |

It is certified that error appears in the above-identified patent and that said Letters Patent is hereby corrected as shown below:

Specification, Col. 2, line 54, before "crosstalk", change "worst case" to --worst-case-- .

Specification, Col. 2, line 63, after "example," delete -- that -- .

Specification, Col. 4, line 15, after "filtered" insert -- channel(s) -- .

Specification, Col. 4, line 30, first occurrence, change "wavelength selective" to -- wavelength-selective -- .

Specification, Col. 4, line 30 - 31, second occurrence, change "wavelength selective" to -- wavelength-selective -- .

Specification, Col. 5, line 4, after "conventional", change "spectrally selective" to -- spectrally-selective -- .

Specification, Col. 5, line 5-6, change "spectrally selective" to -- spectrally-selective -- .

Specification, Col. 5, line 14, before "two", change "supports" to --support-- .

Specification, Col. 7, line 25, before "interference", change "out of band" to -- out-of-band -- .

Specification, Col. 7, line 67, after "twice", change "a" to -- as -- .

Claim 8, Col. 10, Line 9, before "bi-directional", change "waveguide supporting" to -- waveguide-supporting -- .

Claim 8, Col. 10, Line 9, after "WDM", change "signals" to -- signal -- .

Claim 9, Col. 10, Line 36, after "8", delete "-" .

UNITED STATES PATENT AND TRADEMARK OFFICE
CERTIFICATE OF CORRECTION

PATENT NO. : 7,133,612 B1
APPLICATION NO. : 10/214834
DATED : November 7, 2006
INVENTOR(S) : Thomas Andrew Strasser et al.

It is certified that error appears in the above-identified patent and that said Letters Patent is hereby corrected as shown below:

Claim 9, Col. 10, Line 36, after "method", change "or" to -- of -- .

Claim 10, Col. 10, Line 39-40, change "wavelength selective" to

-- wavelength-selective -- .

Claim 11, Col. 10, Line 41-42, change "wavelength selective" to

-- wavelength-selective -- .

Claim 12, Col. 10, Line 44-45, change "wavelength selective" to

-- wavelength-selective -- .

Claim 13, Col. 10, Line 47-48, change "wavelength selective" to

-- wavelength-selective -- .

Claim 14, Col. 10, Line 50-51, change "wavelength selective" to

-- wavelength-selective -- .

Signed and Sealed this

Fifteenth Day of May, 2007

JON W. DUDAS
*Director of the United States Patent and Trademark Office*